US011996688B2

United States Patent
Benmouyal et al.

(10) Patent No.: US 11,996,688 B2
(45) Date of Patent: May 28, 2024

(54) METHOD OF CONTROLLED SWITCHING FOR TRANSFORMERS USING TRANSFORMER RESIDUAL FLUX

(71) Applicant: Schweitzer Engineering Laboratories, Inc., Pullman, WA (US)

(72) Inventors: Gabriel Benmouyal, Boucherville (CA); Ritwik Chowdhury, Charlotte, NC (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 480 days.

(21) Appl. No.: 17/318,440

(22) Filed: May 12, 2021

(65) Prior Publication Data

US 2022/0385058 A1    Dec. 1, 2022

(51) Int. Cl.
*H02H 7/04* (2006.01)
*G05B 19/042* (2006.01)
*H02H 1/00* (2006.01)

(52) U.S. Cl.
CPC ............ *H02H 7/04* (2013.01); *G05B 19/0428* (2013.01); *H02H 1/0007* (2013.01); *H02H 1/0092* (2013.01); *G05B 2219/21155* (2013.01)

(58) Field of Classification Search
CPC ...... H02H 1/0007; H02H 1/0092; H02H 7/04; H02H 9/002; H01H 9/56; G05B 19/0428; G05B 2219/21155
See application file for complete search history.

(56) References Cited

U.S. PATENT DOCUMENTS

| 4,757,263 A | 7/1988 | Cummings |
| 4,914,382 A | 4/1990 | Douville |

(Continued)

FOREIGN PATENT DOCUMENTS

| CN | 115218963 A | * 10/2022 |
| WO | WO-2022144165 A1 | * 7/2022 |

OTHER PUBLICATIONS

Tan "Residual flux estimation method for three-phase transformers without zero-sequence circuit on the switch-off side". 2016 IEEE PES Asia-Pacific Power and Energy Engineering Conference (APPEEC). Retrieved from Internet:<https://ieeexplore.ieee.org/stamp/stamp.jsp?tp=&arnumber=7779821> (Year: 2016).*
Gabriel Benmouyal, et al., "A Unified Approach of Controlled Switching of Power Equipment," Oct. 2017.
European Patent Application 22171487.6, Extended Search Report, Sep. 23, 2022.

(Continued)

*Primary Examiner* — Jared Fureman
*Assistant Examiner* — Nicolas Bellido
(74) *Attorney, Agent, or Firm* — Bradley W. Schield; Richard M. Edge

(57) ABSTRACT

An intelligent electronic device (IED) may obtain a voltage measurement matrix based on an arrangement of a transformer in a power system. The IED may obtain a delta connection compensating angle based on the location of the circuit breaker and the transformer arrangement. The IED may obtain voltage measurements of the transformer. The IED may determine a residual flux value of the transformer based at least in part on the voltage measurements, the voltage measurement matrix and the delta connection compensating angle. The IED may send a signal to a circuit breaker of the transformer to connect the transformer to the power system based at least in part on the system voltage and residual flux value.

20 Claims, 6 Drawing Sheets

(56) References Cited

U.S. PATENT DOCUMENTS

| | | | |
|---|---|---|---|
| 5,430,599 | A | 7/1995 | Charpentier |
| 5,627,415 | A | 5/1997 | Charpentier |
| 5,703,745 | A | 12/1997 | Roberts |
| 6,028,754 | A | 2/2000 | Guzman |
| 6,865,063 | B2 | 3/2005 | Ball |
| 6,919,717 | B2 | 7/2005 | Ghassemi |
| 7,880,343 | B2 | 2/2011 | Kleinecke |
| 8,310,106 | B2 | 11/2012 | Koshiduka |
| 8,878,391 | B2 | 11/2014 | Taylor |
| 9,379,535 | B2 | 6/2016 | Taylor |
| 2004/0090726 | A1 | 5/2004 | Ball |
| 2009/0251009 | A1 | 10/2009 | Kleinecke |
| 2010/0141235 | A1 | 6/2010 | Koshiduka |

OTHER PUBLICATIONS

Mahgoub O A: "Microcontroller-based switch for three-phase transformer inrush current minimization", Power Electronics Congress, 1996. Technical Proceedings. Ciep '96., V IEEE International Cuernavaca, Mexico Oct. 14-17, 1996, New York, NY, USA, IEEE, US Oct. 14, 1996 (Oct. 14, 1996), pp. 107-112.

Pachore Parvraj et al: "Flux Error Function Based Controlled Switching Method for Minimizing Inrush Current in 3-Phase Transformer", IEEE Transactions on Power Delivery, IEEE Service Center, New York, NY, US vol. 36, No. 2, May 18, 2020, pp. 870-879.

* cited by examiner

METHOD OF CONTROLLED SWITCHING FOR TRANSFORMERS USING TRANSFORMER RESIDUAL FLUX

TECHNICAL FIELD

The present disclosure relates generally to controlled switching of transformers and, more particularly, to transformer-controlled closing using residual flux.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
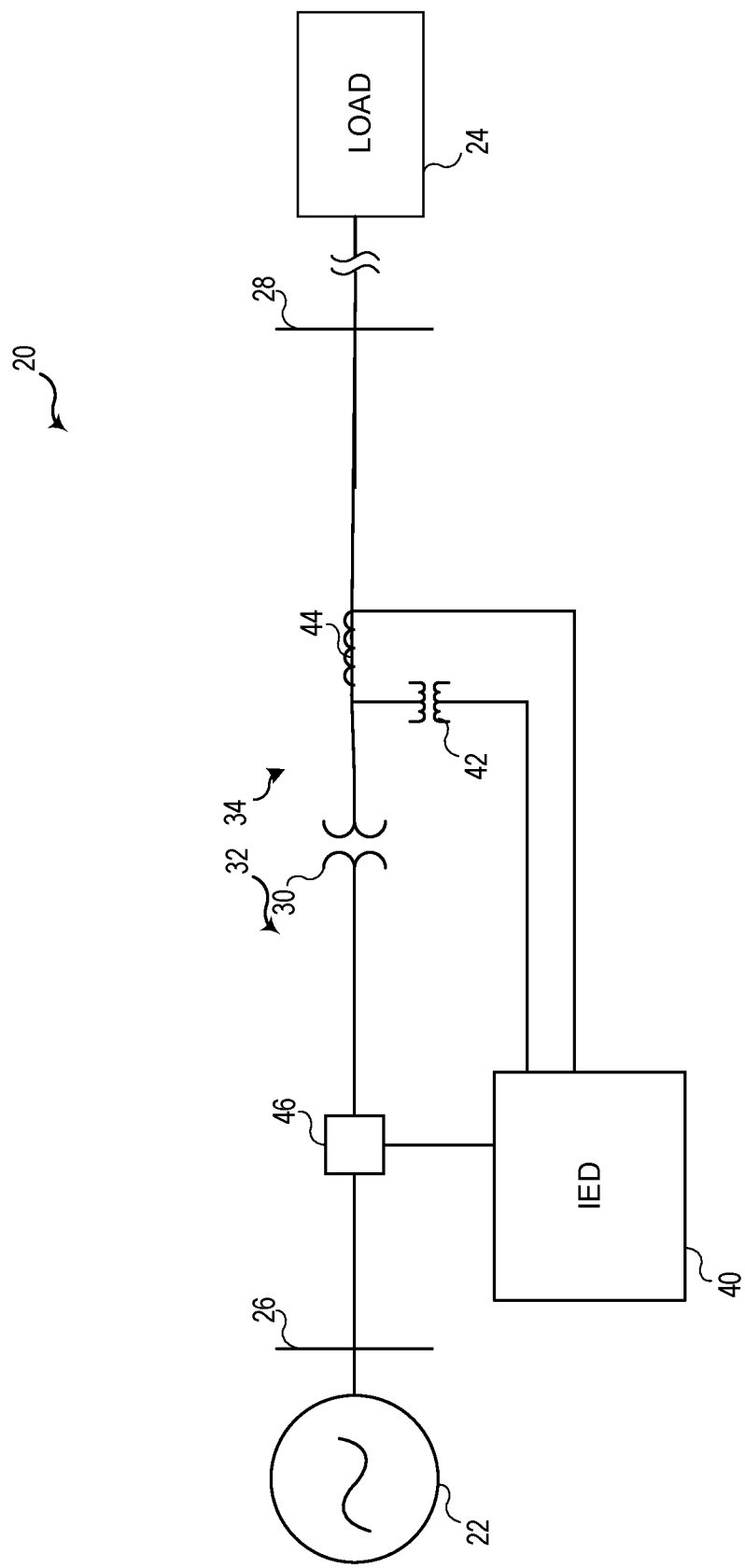
FIG. 1 is a one-line diagram of an electric power delivery system having an intelligent electronic device (IED) that uses residual flux to perform a controlled close to connect a transformer, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Transformers may be used in power systems to step-up or step-down voltages to suitable levels for power lines, buses, loads, or generators. Various intelligent electronic devices (IEDs) may be used in monitoring, control, and protection of the power delivery system. IEDs may obtain voltage measurements and/or current measurements and send signals to control devices on the power system. For example, transformer relays may obtain voltage measurements of windings of a transformer and disconnect the transformer based on the voltage measurements to protect the transformer or to improve operating conditions of the power system.

Transformers may be disconnected from a power system due to inspection or servicing of the transformer. When de-energizing the transformer by disconnecting the transformer, charge may remain on the transformer that varies depending on the flux of the transformer. Following the inspection, the transformer may be re-energized by reconnecting to the power system. During re-energization, a difference between the prospective flux on the power system and the residual flux on the transformer may cause a current inrush on the power system. Depending on the power system and the extent of this flux difference, the current inrush may result in voltage transients that may reduce the power quality of the power system, reduce reliability of the system protecting power system, and increase stress and reduce life of the transformer.

To account for the flux difference, a controlled close of the transformer may be performed in which the transformer is connected to the power system at a time based on the residual flux of the transformer. However, how the IED accounts for the difference between the residual flux and the prospective flux depends on the arrangement of the transformer, which may involve different configurations of the IED for each implementation. Configuring each IED may take significant time and may increase the complexity of the configuration process. Accordingly, there is a need to perform controlled closing of the transformer to account for the flux difference while also simplifying configuration of the IED.

As explained below, an IED may obtain an arrangement of the transformer. The arrangement may include whether the transformer is a wye-wye, wye-delta, or delta-wye, whether the transformer is grounded or ungrounded, and whether the sensors are on the primary side or the secondary side. The IED may obtain a voltage measurement matrix based on the arrangement of the transformer. The IED may obtain voltage measurements of the transformer. The IED may determine a residual flux value of the transformer based at least in part on the voltage measurements and the voltage measurement matrix. The IED may then close the circuit breaker of the transformer to connect the transformer at a time based on the residual flux of the transformer and the prospective flux of the power system to prevent current inrush, thereby reducing stress on the power system.

FIG. 1 is a one-line diagram of a power system 20 that includes a power source 22, such as a distributed generator, that provides power to one or more loads 24. The power system 20 includes a transformer 30, such as a step-up or step-down transformer, that communicatively connects a primary side 32 and a secondary side 34. Voltages on the primary side 32 of the transformer 30 produce a varying magnetic flux that induces a voltage on the secondary side to allow electrical energy to be transformed to a level to power the load 24. Although illustrated in single-line form for purposes of simplicity, power system 20 may be a multi-phase system, such as a three-phase electric power delivery system. Further, while the power source 22, the load 24, and the transformer 30 are illustrated, any suitable number of power sources, loads, buses, transformers may be used in different power systems.

The transformer 30 is monitored by an IED 40, although additional IEDs (e.g., IEDs on high and low ends of the transformer 30) may also be utilized. As used herein, an IED (such as IED 40) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

IED 40 may obtain electric power system information using voltage transformers (VTs) 42 and/or current transformers (CTs) 44. The IED 40 may detect fault events of the transformer 30 using voltage signals of the VTs 42 and/or current signals of the CTs 44.

The IED 40 may send a signal to a circuit breaker (CB) 46 to open the CB 46, thereby disconnecting the transformer 30 from the power source 22 to allow an operator to service the transformer. Magnetic flux may remain on the transformer 30 due to voltages present on the transformer 30 when the transformer 30 is disconnected.

Figure 2:
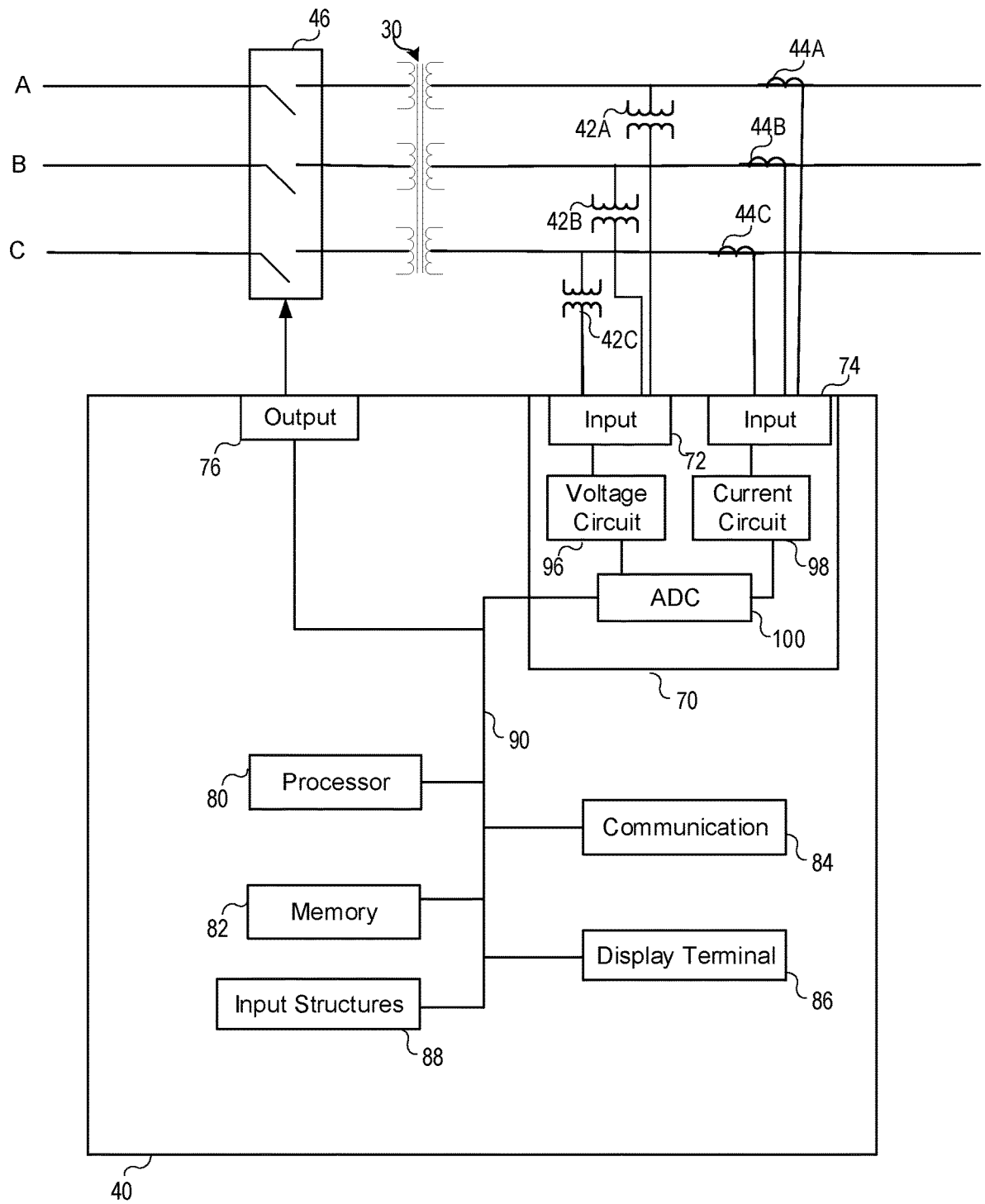
FIG. 2 is a block diagram of the IED of FIG. 1, in accordance with an embodiment.

FIG. 2 is a block diagram of the IED 40 connected to the CBs 46 in a three-phase power system. The IED 40 may open the CB 46 due to an event on or connected to the transformer or due to servicing of the transformer 30. The IED 40 may determine magnetic flux on each phase A-C of the transformer 30. The IED 40 may be connected to VTs 42 and CTs 44 via inputs 72 and 74 of input circuitry 70 to allow the IED 40 to receive signals of electrical conditions (e.g., voltage and current). The IED 40 may be connected to the CB 46 via the outputs 76 to allow the IED 40 to send a signal to the CB 46 to open or close the CB 46. The inputs 72 and 74 and output 76 may refer to ports, connectors, pins, and the like, used to connect the IED 40 to other devices.

The IED 40 may further include one or more processors 80, a computer-readable medium (e.g., memory 82), a communication interface 84, a display terminal 86, and input structures 88 communicatively coupled to each other via one or more communication buses 90. The processor 80 may be embodied as a microprocessor, a general-purpose integrated circuit, an application specific integrated circuit (ASIC), a field programmable gate array (FPGA), and/or other programmable logic devices. It should be noted that the processor 80 and other related items in FIG. 2 (e.g., the memory 82) may be generally referred to herein as "processing circuitry." Furthermore, the processing circuitry may be a single contained processing module or may be incorporated wholly or partially within any of the other elements within the IED 40. It should be noted that FIG. 2 is merely one example of a particular implementation and is intended to illustrate the types of components that may be present in the IED 40.

In the IED 40 of FIG. 2, the processor 80 may be operably coupled with the memory 82 to perform various algorithms. Such programs or instructions executed by the processor 80 may be stored in any suitable article of manufacture that includes one or more tangible, computer-readable media at least collectively storing the instructions or routines, such as the random-access memory and the read-only memory.

In the illustrated embodiment, the IED 40 includes input circuitry 70 that detects various electrical conditions of the transformer 30 based on the input signals. The input circuitry 70 may include a voltage conversion circuit 96 and a current conversion circuit 98 that transform the input signals to levels that may be sampled by the IED 40. The input circuitry 70 may include analog-to-digital converter(s) 100 that sample the current and voltage signals and produce digital signals representative of measured current and measured voltage on the transformer 30 or to the connection limbs of the transformer 30, which may be transmitted to the processor 80. The IED 40 may compare the current and/or voltage to thresholds to detect faults and to disconnect the transformer 30 from the power source 22. For example, if current on one or more phases A-C exceeds a preset threshold and/or current-over-time exceeds a preset threshold, the processor 80 may detect a fault event and send a signal to open the CB 46.

In some embodiments, the IED 40 may include a communication interface 84, such as a fiber optic transceiver, to communicate with other IEDs. Further, the IED 40 may include a display terminal 86 and input structures (e.g., Universal-Serial-Bus (USB) ports, buttons, touchscreens, etc.) to allow operators to review events on the transformer 30, change settings, etc.

The CB 46 may be opened to de-energize the transformer 30, for example, to allow for servicing of the transformer 30. Upon de-energizing the transformer 30, residual flux may remain on the disconnected transformer 30. Following maintenance/inspection, the transformer 30 may be re-energized by closing CB 46.

During closing of the CB 46, there may be a flux difference between the limbs of transformer 30 due to the residual magnetic flux remaining on the disconnected, de-energized transformer 30 and the prospective flux associated with the voltage of the power line energized by the power source 22 upstream of the CB 46, which may cause a current inrush. Depending on the power system 20 and the extent of this flux difference, the current inrush may result in voltage transients that may reduce the power quality of the power system 20, reduce reliability of the system protecting power system 20, and increase stress and reduce life of the transformer 30. As explained below, the IED 40 may close the CB 46 at a point-on-wave (POW) that reduces or minimizes this current inrush due to the residual flux of the transformer 30.

The IED 40 may derive instantaneous voltage values that are calculated from the measured voltages obtained via the voltage sensors (e.g., VTs 42A-C). The instantaneous voltage values may be integrated to obtain the residual flux. However, the instantaneous values that are used to obtain the residual flux depend on the arrangement of the transformer 30.

To enable the IED 40 to minimize the current inrush due to the residual flux while reducing complexity of the installation process, a voltage measurement matrix (VMM) may be used that accounts for the different arrangements of the transformer (e.g., different VT placements and transformer connections) to derive the instantaneous voltage values that are integrated.

Figure 3:
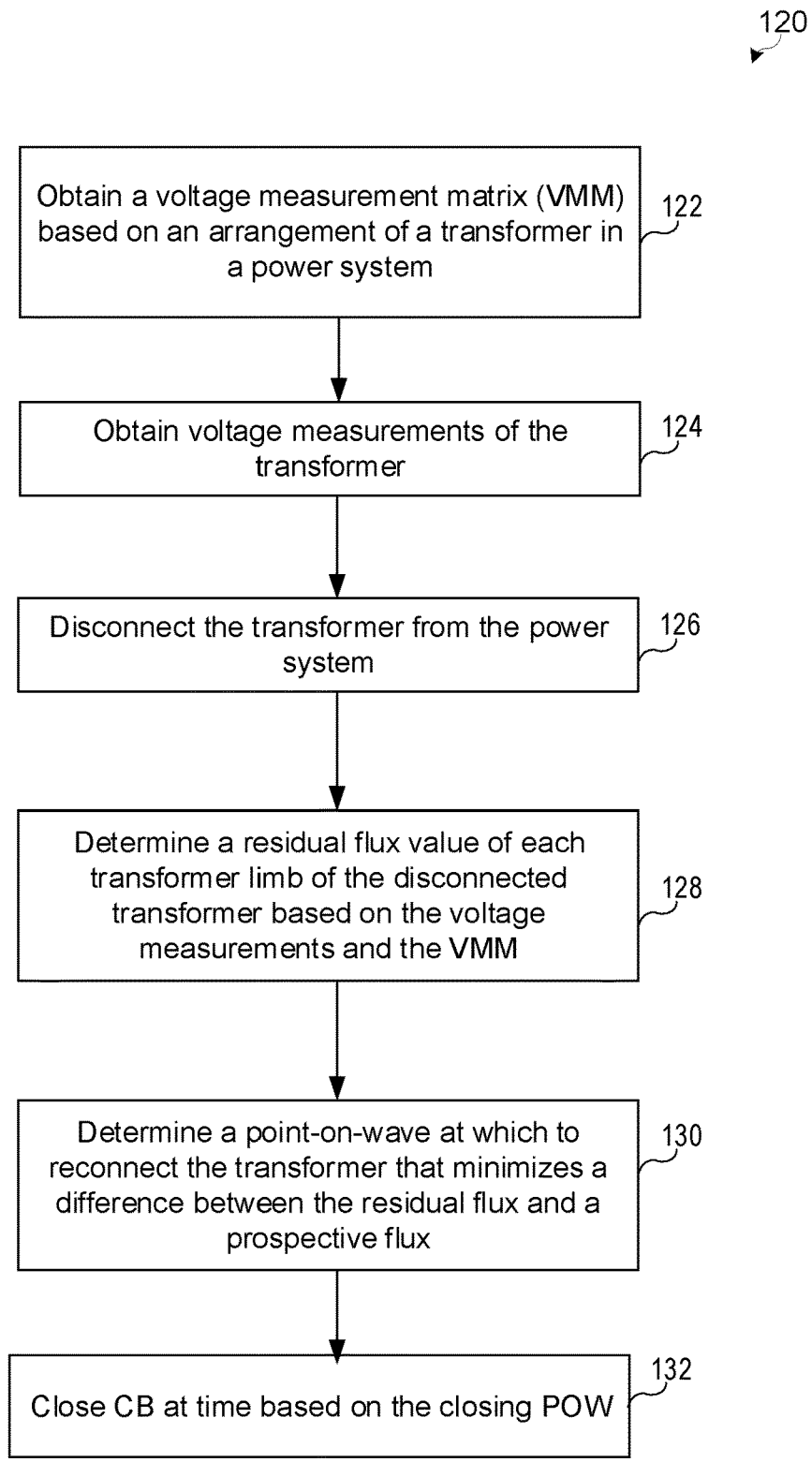
FIG. 3 is a flow chart of a process performed by the IED of FIG. 1 to close the CB based on the residual flux of the transformer, in accordance with an embodiment.

FIG. 3 is a flow chart of a process 120 that may be performed by the IED 40 to re-energize the transformer at a POW that minimizes inrush current due to residual flux of the transformer while allowing for a simplified configuration of the IED 40 that makes commissioning faster, simpler, and more reliable. Instructions (e.g., code) may be stored on the memory 82 to be executed by the processor 80 to cause the IED 40 to perform the process 120.

The process 120 may begin with the IED 40 obtaining an arrangement of the transformer 30 in the power system during commissioning of the IED 40 (block 122). The arrangement of the transformer 30 may refer to the different electrical connection configurations between the VTs 42 with respect to the transformer 30 and the connections between the primary and secondary sides of the transformer 30. The primary and secondary sides of the transformer 30 may be a wye-delta, delta-wye, or wye-wye connections.

Further, the primary and secondary connections may be grounded or ungrounded. The VTs 42 may be placed on the primary side or the secondary side. Each of these configurations may involve different calculations in obtaining the residual flux for the obtained voltage measurements from the VTs 42.

Figure 4:
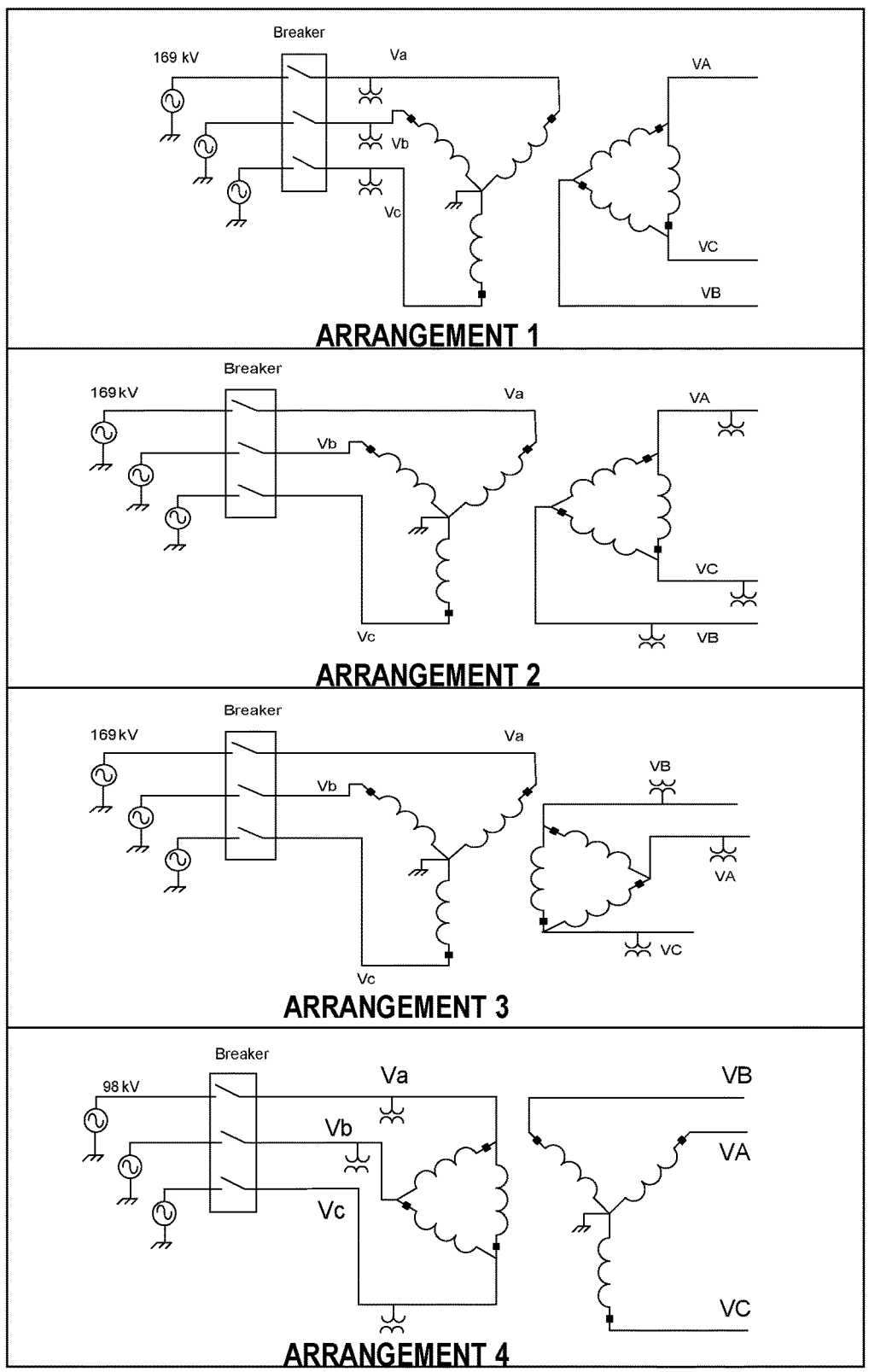
FIG. 4 is a first set of potential transformer arrangements in which the IED of FIG. 1 may be commissioned, in accordance with an embodiment.
Figure 5:
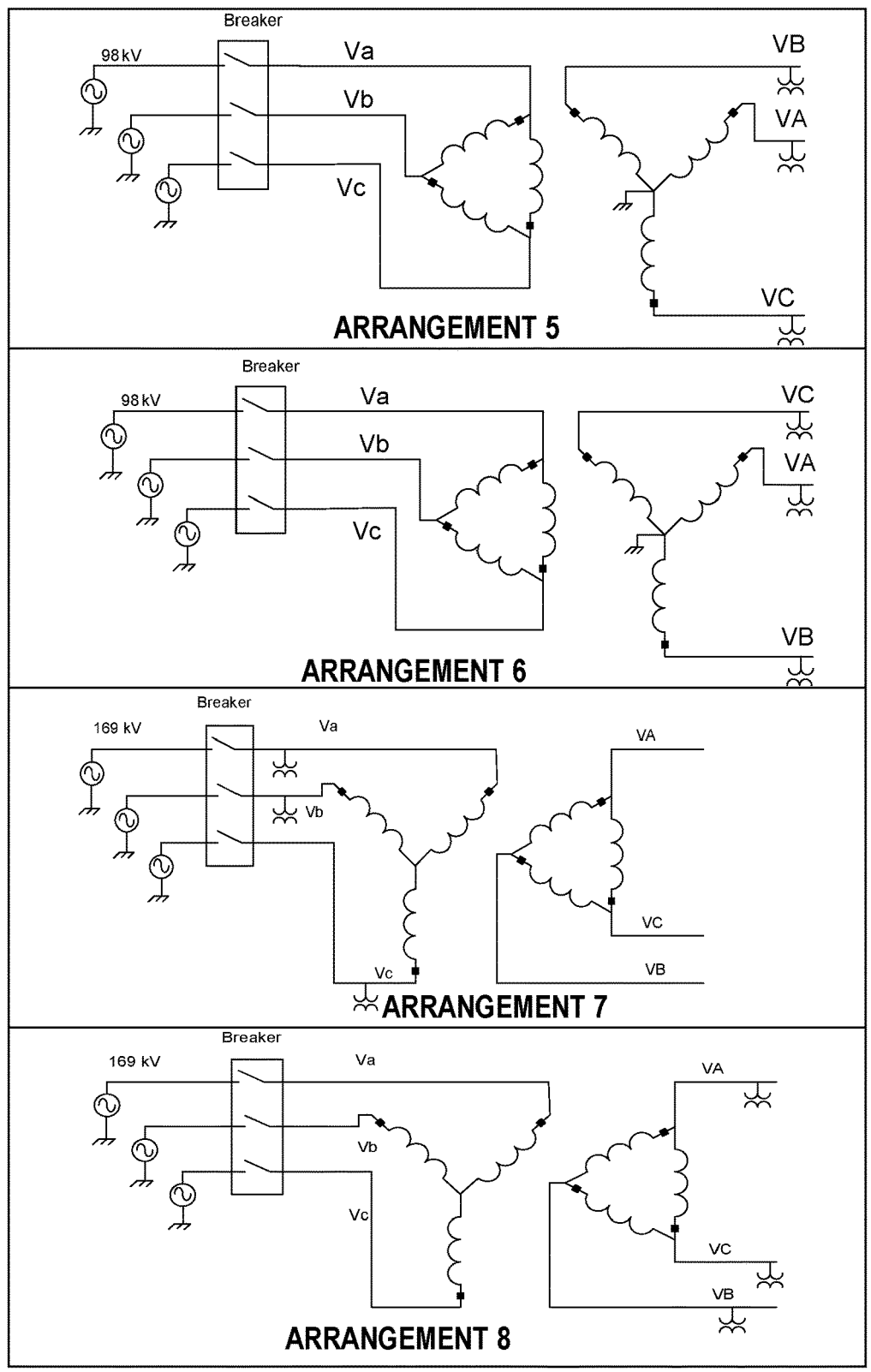
FIG. 5 is a second set of potential transformer arrangements in which the IED of FIG. 1 may be commissioned, in accordance with an embodiment.
Figure 6:
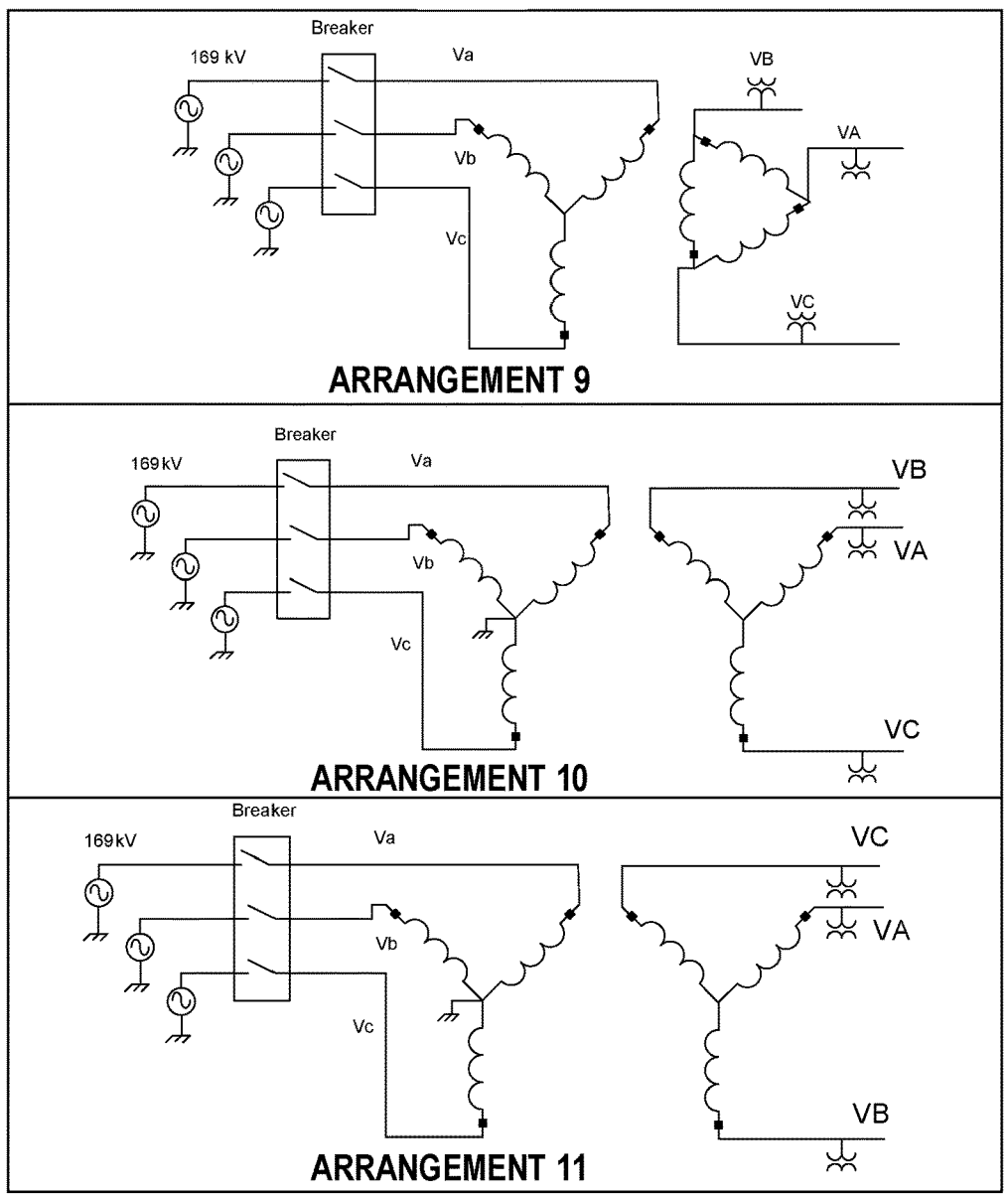
FIG. 6 is a third set of potential transformer arrangements in which the IED of FIG. 1 may be commissioned, in accordance with an embodiment.

To simplify the configuration process of the IED 40, the IED 40 may display a prompt to allow an operator to select an arrangement of the transformer 30 from a list of potential arrangements. For example, different potential arrangements are shown in FIGS. 4-6. The list of potential arrangements may be displayed as a schematic, in a text description, or the like.

The IED 40 may receive a selection of the actual arrangement of the transformer 30 from the list of the potential arrangements. The IED 40 may determine a VMM of the selected arrangement of the transformer 30. For example, a look-up table of VMMs for each of the potential arrangements may be stored in the memory 82. The VMM allows for deriving the instantaneous voltage values that are integrated to obtain the residual flux. By applying the corresponding VMM to the voltage measurements, the VTs 42 may be installed on any arrangement of windings of the transformer 30, and the IED 40 may obtain the residual flux values of the transformer 30. Consider the transformer arrangement of FIG. 4, arrangement 1, with Y-grounded primary windings and delta-connected windings at the secondary. The voltages that are integrated to obtain the residual flux correspond directly to the measured voltages such that the VMM of arrangement 1 is defined as:

$$\begin{bmatrix} Va \\ Vb \\ Vc \end{bmatrix} = \text{sqrt}(3) \cdot \begin{bmatrix} 1 & 0 & 0 \\ 0 & 1 & 0 \\ 0 & 0 & 1 \end{bmatrix} \cdot \begin{bmatrix} VA \\ VB \\ VC \end{bmatrix} \quad \text{(Eq. 1)}$$

where VX is the voltage of the X phase on the primary windings as obtained by the VTs 42. The resultant voltages that are integrated, Vx, correspond directly to the measurement voltages VX, so that a type 1 VMM unit matrix is defined above. Note that the scaling applied in front of the matrix is to bring the voltage magnitudes to the nominal line-to-line voltage rating (VNOMSRC).

In the illustrated embodiments, there are six VMMs that may be used. These six matrices are presented in equations 2-7:

$$VMM(0) = \text{sqrt}(3) \cdot \begin{bmatrix} 1 & 0 & 0 \\ 0 & 1 & 0 \\ 0 & 0 & 1 \end{bmatrix} \quad \text{Eq. 2}$$

$$VMM(1) = \begin{bmatrix} 1 & -1 & 0 \\ 0 & 1 & -1 \\ -1 & 0 & 1 \end{bmatrix} \quad \text{Eq. 3}$$

$$VMM(2) = \begin{bmatrix} 1 & 0 & -1 \\ -1 & 1 & 0 \\ 0 & -1 & 1 \end{bmatrix} \quad \text{Eq. 4}$$

$$VMM(3) = 1/\text{sqrt}(3) * \begin{bmatrix} 1 & -2 & 1 \\ 1 & 1 & -2 \\ -2 & 1 & 1 \end{bmatrix} \quad \text{Eq. 5}$$

$$VMM(4) = 1/\text{sqrt}(3) * \begin{bmatrix} 1 & 1 & -2 \\ -2 & 1 & 1 \\ 1 & -2 & 1 \end{bmatrix} \quad \text{Eq. 6}$$

$$VMM(UD) = \begin{bmatrix} a_{11} & a_{12} & a_{13} \\ a_{21} & a_{22} & a_{23} \\ a_{31} & a_{32} & a_{33} \end{bmatrix} \quad \text{Eq. 7}$$

where equation 7 is a user-defined matrix, and $a_{xx}$ are user configurable variables.

The VMMs may be multiplied to the measured voltages to obtain three quantities that may be used to estimate the residual flux in the transformer. Table 1 is a list of potential arrangements and associated VMM, as shown in equations 2-7. As set forth in equations 1 and 8-17, the VMMs may be applied to the winding arrangements in Table 1 to obtain the residual voltage values of the transformer.

$$\begin{bmatrix} Va \\ Vb \\ Vc \end{bmatrix} = \begin{bmatrix} 1 & -1 & 0 \\ 0 & 1 & -1 \\ -1 & 0 & 1 \end{bmatrix} \cdot \begin{bmatrix} VA \\ VB \\ VC \end{bmatrix} \quad \text{Eq. 8}$$

$$\begin{bmatrix} Va \\ Vb \\ Vc \end{bmatrix} = \begin{bmatrix} 1 & 0 & -1 \\ -1 & 1 & 0 \\ 0 & -1 & 1 \end{bmatrix} \cdot \begin{bmatrix} VA \\ VB \\ VC \end{bmatrix} \quad \text{Eq. 9}$$

$$\begin{bmatrix} Va - Vb \\ Vb - Vc \\ Vc - Va \end{bmatrix} = \begin{bmatrix} 1 & -1 & 0 \\ 0 & 1 & -1 \\ -1 & 0 & 1 \end{bmatrix} \cdot \begin{bmatrix} Va \\ Vb \\ Vc \end{bmatrix} \quad \text{Eq. 10}$$

$$\begin{bmatrix} Va - Vb \\ Vb - Vc \\ Vc - Va \end{bmatrix} = \text{sqrt}(3) \cdot \begin{bmatrix} 1 & 0 & 0 \\ 0 & 1 & 0 \\ 0 & 0 & 1 \end{bmatrix} \cdot \begin{bmatrix} VA \\ VB \\ VC \end{bmatrix} \quad \text{Eq. 11}$$

$$\begin{bmatrix} Va - Vb \\ Vb - Vc \\ Vc - Va \end{bmatrix} = \text{sqrt}(3) \cdot \begin{bmatrix} 1 & 0 & 0 \\ 0 & 0 & 1 \\ 0 & 1 & 0 \end{bmatrix} \cdot \begin{bmatrix} VA \\ VB \\ VC \end{bmatrix} \quad \text{Eq. 12}$$

$$\begin{bmatrix} Va - Vb \\ Vb - Vc \\ Vc - Va \end{bmatrix} = \begin{bmatrix} 1 & -1 & 0 \\ 0 & 1 & -1 \\ -1 & 0 & 1 \end{bmatrix} \cdot \begin{bmatrix} Va \\ Vb \\ Vc \end{bmatrix} \quad \text{Eq. 13}$$

$$\begin{bmatrix} Va - Vb \\ Vb - Vc \\ Vc - Va \end{bmatrix} = \frac{1}{\text{sqrt}(3)} \cdot \begin{bmatrix} 1 & -2 & 1 \\ 1 & 1 & -2 \\ -2 & 1 & 1 \end{bmatrix} \cdot \begin{bmatrix} VA \\ VB \\ VC \end{bmatrix} \quad \text{Eq. 14}$$

$$\begin{bmatrix} Va - Vb \\ Vb - Vc \\ Vc - Va \end{bmatrix} = \frac{1}{\text{sqrt}(3)} \cdot \begin{bmatrix} 1 & 1 & -2 \\ -2 & 1 & 1 \\ 1 & -2 & 1 \end{bmatrix} \cdot \begin{bmatrix} VA \\ VB \\ VC \end{bmatrix} \quad \text{Eq. 15}$$

$$\begin{bmatrix} Va - Vb \\ Vb - Vc \\ Vc - Va \end{bmatrix} = \begin{bmatrix} 1 & -1 & 0 \\ 0 & 1 & -1 \\ -1 & 0 & 1 \end{bmatrix} \cdot \begin{bmatrix} VA \\ VB \\ VC \end{bmatrix} \quad \text{Eq. 16}$$

$$\begin{bmatrix} Va - Vb \\ Vb - Vc \\ Vc - Va \end{bmatrix} = \begin{bmatrix} 1 & 0 & -1 \\ 0 & -1 & 1 \\ -1 & 1 & 0 \end{bmatrix} \cdot \begin{bmatrix} VA \\ VB \\ VC \end{bmatrix} \quad \text{Eq. 17}$$

where Vx represents the voltage of the x phase of the primary windings and VX represents the voltage of the X phase of the secondary windings. To obtain the residual fluxes in the transformer cores, some of the voltages integrated are differential voltages ($V_{a-Vb}$, $V_{b-Vc}$, and $V_{c-Va}$), and the voltage multiplied by the VMM may depend on the VT location.

TABLE A1.1

VMM and DCCA for different windings arrangements

| Windings Arrangement | VMM Equation | DCCA |
|---|---|---|
| 1 | 1 | 0 |
| 2 | 8 | 0 |
| 3 | 9 | 0 |
| 4 | 10 | −30 |
| 5 | 11 | −30 |
| 6 | 12 | −30 |
| 7 | 13 | −30 |
| 8 | 14 | −30 |
| 9 | 15 | −30 |
| 10 | 16 | −30 |
| 11 | 17 | −30 | where the windings arrangements are labeled in FIGS. 4-6, the VMM equations are listed above, and DCCA is the delta connection compensating angle for an ABC phase rotation (PHROT).

The same matrices in Table A1.1 are also applicable to ACB phase rotation. As an example, if the arrangement 2 in table A1.1 is considered in ACB phase rotation, the VMM matrix still remains as:

$$\begin{bmatrix} VA \\ VB \\ VC \end{bmatrix} = \begin{bmatrix} 1 & -1 & 0 \\ 0 & 1 & -1 \\ -1 & 0 & 1 \end{bmatrix} \cdot \begin{bmatrix} VA \\ VB \\ VC \end{bmatrix} \quad \text{Eq. 17}$$

The DCCA for an ACB phase rotation system is the negative of the values shown in Table A1.1.

Returning to FIG. 3, upon obtaining the VMM and commissioning of the IED 40, the IED 40 may obtain voltage measurements of the transformer 30 (block 124). The IED 40 may obtain a signal indicating that the transformer 30 is disconnected from the power system 20 (block 126). For example, the IED 40 may receive a signal from an operator to open the CB to allow the operator to service the transformer 30.

As indicated by equation 10, the voltages that are integrated may be differential voltages to determine fluxes that are also differential. As an example, for (Va–Vb), the residual flux at the moment of de-energization may be determined as:

$$\varphi_{resAB} = \frac{1}{\text{sqrt}(2)} \cdot \frac{2\pi NFREQ}{VNOMSRC} \cdot \sum_{n=1}^{n=s-1}\left(\frac{Vab_n + Vab_{n+1}}{2}\right) \cdot \frac{1}{Fsamp} \quad \text{Eq. 18}$$

where $\varphi_{resAB}$ is the residual flux differential between the A and B phases, NFREQ is the nominal frequency, VNOMSRC is the voltage magnitudes to the nominal line-to-line voltage rating, $Vab_n$ is the voltage differential between the A and B phases at the nth sample, and Fsamp is the sampling frequency. The point-on-wave (POW) may be determined immediately prior to re-energization as:

$$TCpowAB = \cos^{-1}\left(\frac{\varphi_{resAB} * VNOMSRC}{-VABZM}\right) \quad \text{Eq. 19}$$

where TCpowAB is the point-on-wave that is relative to the A-B phases and VABZM is the scale of the voltage $V_{AB}$. Equations 18 and 19 are more generally explained in equations 21-23 below.

Since the breaker pole to be closed is relative to phase A, the point-on-wave angle relative to phase A is calculated by introducing the DCCA:

$$TCpowA = TCpowAB + DCCA \quad \text{Eq. 20}$$

The IED 40 may determine a residual flux value of each transformer limb of the disconnected transformer based on the voltage measurements and the VMM (block 128). For example, one technique may be used that allows for determination of a point-on-wave of re-energization with a difference in steady-state voltage magnitudes prior to transformer de-energization and re-energization. The difference in steady-state voltages may occur due to system operating conditions, such as load-flow, or shortly after a transient condition such as a fault that is cleared.

The method may involve calculating the residual flux as:

$$\phi = \left(\frac{SCALE}{\text{sqrt}(2)}\right) * \left(\frac{2\pi * NFREQ}{VNOM}\right) * \int V_{WDG} dt + C \quad \text{Eq. 21}$$

where scale is 1 if the windings are delta-connected and √3 if the winding is wye-grounded, VNOM is the nominal phase-to-phase voltage magnitude, NFREQ is the frequency of the system, and $V_{WDG}$ is the instantaneous voltages of the transformer windings obtained from the VMM equations above. The VNOM and NFREQ quantities may be preset and stored in the memory 82 of the IED 40.

Equation 22 may then be used to calculate the residual flux when the transformer is de-energized.

$$\phi_{RES} = \phi|_{t=T_{OPEN}+N} \quad \text{Eq. 22}$$

That is, the residual flux calculation is done using voltage measurements N cycles after $T_{OPEN}$, where $T_{OPEN}$ is the time when the transformer is de-energized. Equations 21 and 22 have been normalized due to the scaling applied using the VNOM and NFREQ quantities.

Following de-energization and calculation of the residual flux, the processor 80 may wait to receive a close signal. The processor 80 may wait for a command to close the circuit breaker, such as a manual close signal or an automatic close signal. For example, the IED 40 may receive a manual close signal after one or more hours of an operator performing maintenance on the transformer.

Upon receiving a command to close the CB 46 and prior to closing the CB 46, the processor 80 may then determine a POW at which to reconnect the transformer that minimizes a difference between the residual flux and a prospective flux (block 130). Equation 23 is the POW closing angle associated with the closing of the CB 46.

$$TCPOW_{WDG} = \cos^{-1}\left(\frac{\phi_{RES} * VNOM}{-SCALE * |V_{SYS}|}\right) \quad \text{Eq. 23}$$

where $TCPOW_{WDG}$ is the closing POW of the transformer windings and $|V_{SYS}|$ is the magnitude of the system voltage corresponding to the winding calculated when the controlled closing command is received by the IED 40 indicating that the transformer may be reconnected. If the winding is y-grounded, the system voltage corresponds to the phase voltages $V_A$, $V_B$, and $V_C$. If the winding is delta with A and B on the first phase (DAB), the voltage is VAB, VBC, and VCA. For simplicity, these voltages may be reduced to the positive sequence voltage magnitude. In such cases, the corresponding SCALE in equation 23 will be sqrt(3).

In some embodiments, the voltage magnitude of one phase (or phase-to-phase voltage) may be used by generating simulated balanced voltage magnitudes when the closing is initiated. Balanced refers to equal voltage magnitudes on each of the three system phases with angles that are 120 degrees apart. The magnitudes may be off-nominal. Equations 21-23 may be combined into equation 24. In equation 24, the voltage in the denominator is measured at the time of the controlled closing operation. As such, the calculation of the residual flux of equation 21 may be performed when opening the CB 46, and the calculation of TCPOW of equation 23 may be performed during closing of the CB 46.

The IED 40 may then close the CB at a time based on the closing POW (block 132) to minimize the voltage transients due to a difference between the residual flux of the transformer 30 and the prospective flux of the power system 20. For example, the IED 40 may wait to send the close signal to the CB 46 when the POW of the power system matches the POW due to the residual flux of the transformer 30. By matching the residual flux of the transformer with the prospective flux of the power system 20, voltage transients caused by reconnecting the transformer to the power system may be minimized. Further, by using voltage measurement matrices to represent the transformer arrangement of the power system, the commissioning process may be simpler and faster than calculating equations to account for the residual flux of the power system in each IED installed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An intelligent electronic device (IED), comprising:
a memory; and
a processor operatively coupled to the memory, wherein the processor is configured to execute instructions stored on the memory to cause operations comprising:
determining a voltage measurement matrix based on an arrangement of a transformer in a power system;
obtaining voltage measurements of the transformer;
determining a residual flux value of the transformer based at least in part on the voltage measurements and the voltage measurement matrix; and
sending a signal to a circuit breaker of the transformer to connect the transformer to the power system based at least in part on the residual flux value and system voltage magnitude prior to closing the circuit breaker.

2. The IED of claim 1, wherein the processor is configured to execute instructions stored on the memory to cause operations comprising:
displaying a set of potential arrangements for the transformer on a display of the IED;
receiving the arrangement of the transformer, from the set of potential arrangements, indicating a selected arrangement of the transformer in the power system; and
retrieving, from a look-up table of voltage measurement matrices in the memory, the voltage measurement matrix associated with the arrangement of the transformer.

3. The IED of claim 2, wherein the set of potential arrangements comprise relationships between the circuit breaker, voltage sensors, and transformer connections.

4. The IED of claim 3, wherein the processor is configured to execute instructions stored on the memory to cause operations comprising displaying each potential transformer arrangement as a schematic indicating the circuit breaker, voltage sensors, and transformer connections.

5. The IED of claim 3, wherein the transformer connections comprise wye-delta, delta-wye, wye-wye, grounded, ungrounded, or any combination thereof.

6. The IED of claim 3, wherein the relationships between the voltage sensors and the transformer connections comprise primary side voltage sensors or secondary side voltage sensors.

7. The IED of claim 1, wherein the processor is configured to execute instructions stored on the memory to cause operations comprising determining a point-on-wave using a residual flux that accounts for system voltage changes between de-energization and re-energization of the transformer.

8. The IED of claim 7, wherein the residual flux is determined as:

$$\phi = \left(\frac{SCALE}{\sqrt{2}}\right) * \left(\frac{2\pi * NFREQ}{VNOM}\right) * \int V_{WDG} dt + C$$

where SCALE is 1 when the transformer is delta-connected and √3 if the transformer is wye-grounded, NFREQ is a nominal frequency of the power system, VNOM is a nominal phase-to-phase voltage magnitude of the power system, $V_{WDG}$ is the instantaneous voltages of the transformer windings obtained from the voltage measurement matrix (VMM), dt is an integration over time, and C is a constant of integration.

9. The IED of claim 8, wherein the residual flux value when the transformer is de-energized is determined as:

$$\phi_{RES} = \phi \rfloor_{T=T_{OPEN}+N}$$

where $T_{OPEN}$ is the time at which the transformer is de-energized and N is the number of cycles following de-energization.

10. The IED of claim 9, wherein the point-on-wave of closing of the circuit breaker is determined prior to transformer re-energization as:

$$TCPOW_{WDG} = \cos^{-1}\left(\frac{\phi_{RES} * VNOM}{-SCALE * |V_{SYS}|}\right)$$

where VSYS is the system voltage magnitude corresponding to the winding calculated when the controlled closing command is communicated.

11. A non-transitory, computer readable medium, comprising instructions configured to be executed by a processor to cause operations comprising:
determining a voltage measurement matrix based on an arrangement of a transformer in a power system;
obtaining a delta connection compensating angle based on the breaker location, transformer winding configuration connected to the breaker and the system phase rotation
obtaining voltage measurements of the transformer;
determining a residual flux value of the transformer based at least in part on the voltage measurements, the voltage measurement matrix, and the delta connection compensating angle; and
sending a signal to a circuit breaker of the transformer to connect the transformer to the power system based at least in part on system voltage and the residual flux value.

12. The non-transitory, computer-readable medium of claim 11, wherein the instructions are configured to be executed by the processor to cause operations comprising determining a point-on-wave at which to close the CB based on a difference between the residual flux value of the transformer and a prospective flux value of the power system.

13. The non-transitory, computer-readable medium of claim 11, wherein the voltage measurement matrix comprises a three-by-three matrix of voltages to derive instantaneous voltages of windings of the transformer from the voltage measurements.

14. The non-transitory, computer-readable medium of claim 13, wherein the instructions are configured to be executed by the processor to cause operations comprising multiplying a vector of voltages of the A-phase, B-phase, and C-phase with the voltage measurement matrix.

15. A method performed by an intelligent electronic device, (IED), comprising:
 determining a voltage measurement matrix based on an arrangement of a transformer in a power system;
 obtaining voltage measurements of the transformer;
 determining a residual flux value of the transformer based at least in part on the voltage measurements and the voltage measurement matrix; and
 sending a signal to a circuit breaker of the transformer to connect the transformer to the power system at a time based at least in part on the residual flux value.

16. The method of claim 15, wherein the voltage measurement matrix is a user-defined matrix entered during commissioning.

17. The method of claim 15, comprising:
 displaying a set of potential arrangements on a display of the IED;
 receiving the arrangement of the transformer, from the set of potential arrangements, indicating the arrangement of the transformer in the power system; and
 retrieving, from a look-up table of voltage measurement matrices in the memory, the voltage measurement matrix associated with the arrangement of the transformer.

18. The method of claim 17, wherein the set of potential arrangements comprise relationships between the circuit breaker, voltage sensors, and transformer connections.

19. The method of claim 15, wherein the residual flux accounts for system voltage changes between when the transformer was de-energized and when the transformer is re-energized.

20. The method of claim 19, wherein the residual flux is normalized by applying a scale using quantities obtained when re-energizing the transformer.

* * * * *